United States Patent
Satpathy et al.

(10) Patent No.: US 11,755,747 B2
(45) Date of Patent: Sep. 12, 2023

(54) HIGH THROUGHPUT STORAGE ENCRYPTION

(71) Applicant: Meta Platforms Technologies, LLC, Menlo Park, CA (US)

(72) Inventors: Sudhir Satpathy, Redmond, WA (US); Wojciech Stefan Powiertowski, Kirkland, WA (US); Nagendra Gupta Modadugu, San Francisco, CA (US); Neeraj Upasani, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 109 days.

(21) Appl. No.: 17/248,886

(22) Filed: Feb. 11, 2021

(65) Prior Publication Data
US 2022/0207156 A1 Jun. 30, 2022

Related U.S. Application Data

(60) Provisional application No. 63/133,080, filed on Dec. 31, 2020.

(51) Int. Cl.
*G06F 21/60* (2013.01)
*G06F 21/64* (2013.01)
(Continued)

(52) U.S. Cl.
CPC ............ *G06F 21/602* (2013.01); *G06F 3/012* (2013.01); *G06F 13/28* (2013.01);
(Continued)

(58) Field of Classification Search
CPC ........ G06F 21/602; G06F 3/012; G06F 13/28; G06F 15/7807; G06F 21/64; G06F 21/79; G06F 2221/0751
See application file for complete search history.

(56) References Cited

U.S. PATENT DOCUMENTS 8,762,609 B1 * 6/2014 Lam .................... G06F 15/8007 710/72
10,164,770 B1 * 12/2018 Lee ......................... G06F 21/80
(Continued)

FOREIGN PATENT DOCUMENTS

EP 3584989 A1 12/2019

OTHER PUBLICATIONS

Thanasis Tsakoulis et al., "A Performance Enhancement Approach based on Tweak Process Scheduling for a P1619 core", May 2016 (Year: 2016).*
(Continued)

*Primary Examiner* — Theodore C Parsons
*Assistant Examiner* — Alan L Kong
(74) *Attorney, Agent, or Firm* — Shumaker & Sieffert, P.A.

(57) ABSTRACT

An example system on a chip (SoC) includes a security processor configured to store a plurality of key-pairs associated with subsystems of the SoC to a key vault; and an encryption engine configured to: determine a first tweak value based on a first sector address of a storage device; encrypt the first tweak value according to the second key of the key-pair associated with a subsystem; encrypt a first portion of the source data according to a first key of the key-pair and the encrypted first tweak value; determine a second tweak value based on a second sector address of the storage device and encrypt the second tweak value according to the second key prior to completing the encryption of the first portion of the source data; and encrypt a second portion of the source data according to the first key and the encrypted second tweak value.

19 Claims, 10 Drawing Sheets

(51) Int. Cl.
    G06F 21/79    (2013.01)
    G06F 13/28    (2006.01)
    G06F 3/01     (2006.01)
    G06F 15/78    (2006.01)
(52) U.S. Cl.
    CPC .......... *G06F 15/7807* (2013.01); *G06F 21/64* (2013.01); *G06F 21/79* (2013.01); *G06F 2221/0751* (2013.01)

(56) References Cited

U.S. PATENT DOCUMENTS

| | | | | |
|---|---|---|---|---|
| 2009/0060197 | A1* | 3/2009 | Taylor | H04L 9/0844 380/29 |
| 2016/0182223 | A1* | 6/2016 | Kishinevsky | G06F 21/85 380/28 |
| 2016/0364343 | A1* | 12/2016 | Case | G06F 12/145 |
| 2017/0054550 | A1* | 2/2017 | Choi | H04L 9/0637 |
| 2017/0063532 | A1* | 3/2017 | Bhattacharyya | G06F 21/76 |
| 2019/0158293 | A1* | 5/2019 | Chen | G06Q 20/382 |
| 2021/0119780 | A1* | 4/2021 | Hassan | H04L 9/0637 |
| 2022/0138286 | A1* | 5/2022 | Zage | G06F 21/602 726/26 |

OTHER PUBLICATIONS

"IEEE Standard for Cryptographic Protection of Data on Block-Oriented Storage Devices IEEE Computer Society," Apr. 18, 2008 [Retrieved on Apr. 5, 2022], 42 pages, Retrieved from the Internet: URL:https://ieeexplore.ieee.org/stampPDF/getPDF.jsp?tp=&arnumber=4493450&ref=aHROcHM6Ly9pZWVIeHBsb3JlLmiiZWUub3JnL2RvY3VtZW50LzQOOTMONTA.

International Search Report and Written Opinion for International Application No. PCT/US2021/065819, dated May 3, 2022, 10 pages.

"IEEE Standard for Cryptographic Protection of Data on Block-Oriented Storage Devices," in IEEE Std 1619-2018 (Revision of IEEE Std 1619-2007), Jan. 25, 2019, 41 pp.

* cited by examiner

HIGH THROUGHPUT STORAGE ENCRYPTION

CROSS REFERENCE

This application claims the benefit of U.S. Provisional Patent Application No. 63/133,080, filed Dec. 31, 2020, the entire contents of which are incorporated herein by reference.

TECHNICAL FIELD

This disclosure generally relates to data encryption and decryption implemented in various types of computing systems.

BACKGROUND

Many computing systems incorporate content protection or digital rights management technology that includes data encryption and decryption hardware and software. This encryption protects secure data, which is potentially sensitive, private, and/or right-managed and is stored or used on the system, from unauthorized access and exploitation. Examples of computing systems that incorporate encryption and decryption include artificial reality systems. In general, artificial reality is a form of reality that has been adjusted in some manner before presentation to a user, which may include, e.g., a virtual reality, an augmented reality, a mixed reality, a hybrid reality, or some combination and/or derivatives thereof. Artificial reality systems include one or more devices for rendering and displaying content to users. Examples of artificial reality systems may incorporate a head-mounted display (HMD) worn by a user and configured to output artificial reality content to the user. In some examples, the HMD may be coupled (e.g., wirelessly or in tethered fashion) to a peripheral device that performs one or more artificial reality-related functions.

SUMMARY

In general, this disclosure is directed to an encryption engine configured for in-line processing of data at high line-rates (e.g., up to 1 GB/s). The encryption engine may be implemented on a system on a chip (SoC) that has multiple subsystems that encrypt/decrypt data using keys that are unique to the subsystem. In some aspects, the encryption engine can receive key-pairs that are associated with different subsystems or application on the SoC and store the key-pairs in a key vault. The encryption engine can receive configuration information regarding a storage device such as sector size, encryption block size etc. The encryption engine described herein provides separate interfaces for data transfer and for providing programming descriptors. Thus, the encryption engine as described herein can receive scheduling metadata for future data transfer tasks concurrently with existing data transfers. The encryption engine can use the configuration information and transfer task metadata to determine encryption parameters for an Advanced Encryption Standard (AES) encryption technique in advance.

The SoCs of this disclosure provide several technical improvements. The encryption engine as described herein can encrypt data at high data rates and low latency. Further, multiple data transfers can be scheduled and performed without the involvement of other subsystems. For example, once a transfer is scheduled other processors such as security processors or sub-system micro-controller unit (SMCUs) need not be involved with the data transfer.

In one example, this disclosure describes a system on a chip (SoC) that includes a system microcontroller comprising processing circuitry configured to orchestrate operations on the SoC; a security processor comprising processing circuitry configured to store a plurality of key-pairs to a key vault, each of the key-pairs having a first key and a second key, each of the key-pairs associated with one of a plurality of subsystems of the SoC; a Direct Memory Access (DMA) engine comprising circuitry configured to receive, from a subsystem of the plurality of subsystems, storage access parameters identifying source data, a data size, a destination storage address for a storage device, the storage device having a sector size, and a key identifier (ID) identifying a key-pair; and an encryption engine coupled to the DMA engine, the encryption engine comprising processing circuitry configured to: determine a first tweak value based on a first sector address of the storage device, the first sector address based on the destination storage address; encrypt the first tweak value according to the second key of the key-pair associated with the subsystem; encrypt a first portion of the source data according to a first key of the key-pair associated with the subsystem and the encrypted first tweak value; determine a second tweak value based on a second sector address of the storage device and encrypt the second tweak value according to the second key, wherein the second tweak value is determined and encrypted prior to completing the encryption of the first portion of the source data; and encrypt a second portion of the source data according to the first key and the encrypted second tweak value.

In another example, this disclosure describes a method that includes generating, by a security processor, a plurality of key-pairs; providing, by the security processor, the plurality of key-pairs to an encryption engine, wherein the encryption engine stores the plurality of key-pairs to a key vault, each of the key-pairs having a first key and a second key, each of the key-pairs associated with one of a plurality of subsystems of the SoC; receiving, by a DMA engine and from a subsystem of the plurality of subsystems, storage access parameters identifying source data, a data size, and a destination storage address for a storage device, the storage device having a sector size; determining, by the encryption engine, a first tweak value based on a first sector address of the storage device, the first sector address based on the destination storage address; encrypting, by the encryption engine, the first tweak value according to the second key of the key-pair associated with the subsystem; encrypting, by the encryption engine, a first portion of the source data according to a first key of the key-pair associated with the subsystem and the encrypted first tweak value; determining, by the encryption engine, a second tweak value based on a second sector address of the storage device and encrypting the second tweak value according to the second key, wherein the second tweak value is determined and encrypted prior to completing the encryption of the first portion of the source data; and encrypting, by the encryption engine, a second portion of the source data according to the first key and the encrypted second tweak value.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
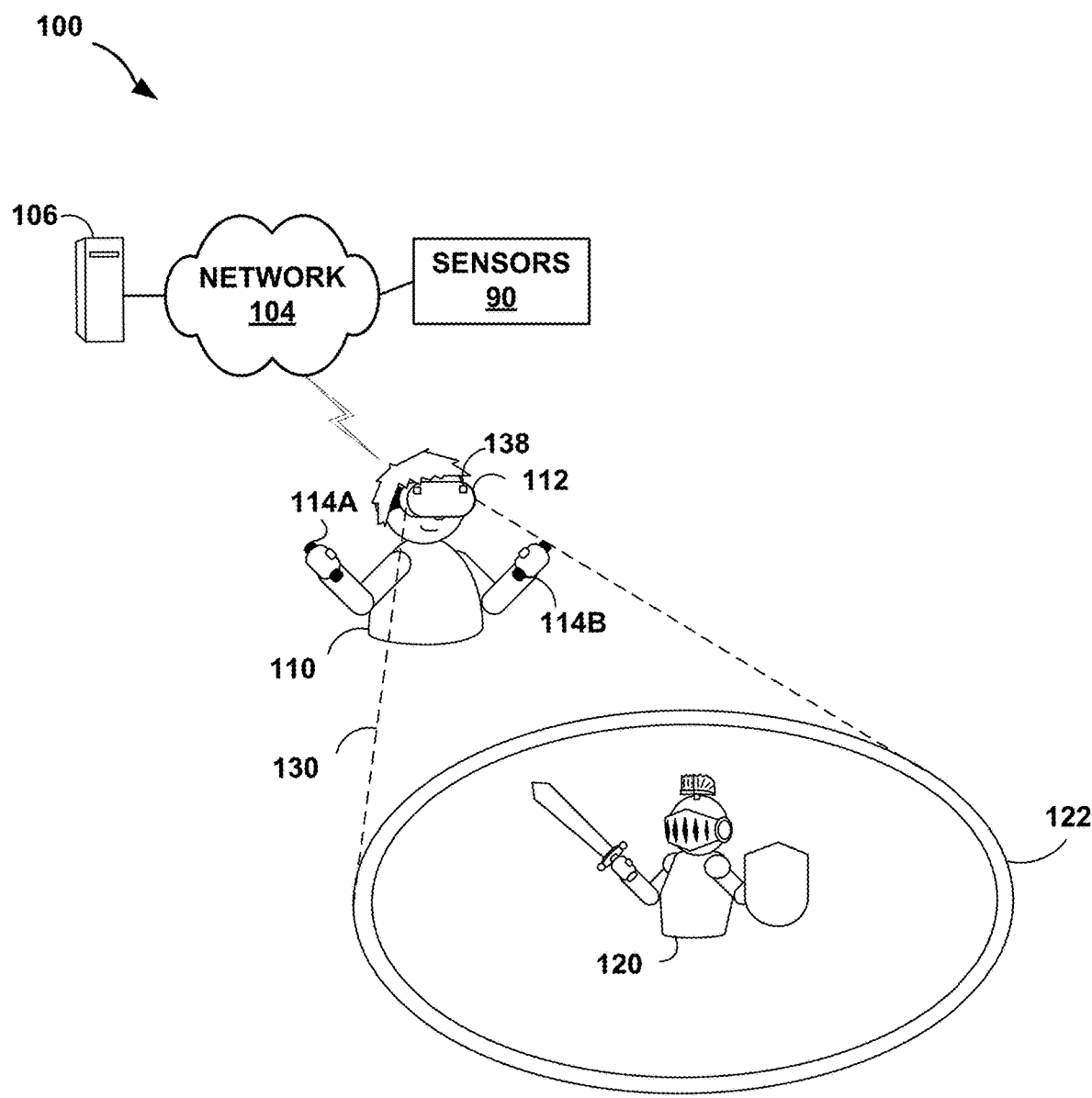
FIG. 1 is an illustration depicting an example artificial reality system that includes an SoC configured to implement high throughput encryption, in accordance with techniques described in this disclosure.

FIG. 1 is an illustration depicting an example artificial reality system that includes an SoC configured to implement high throughput encryption, in accordance with techniques described in this disclosure. The artificial reality system may be a virtual reality system, an augmented reality system, or a mixed reality system. In the example of FIG. 1, artificial reality system 100 includes a head mounted display (HMD) 112, one or more controllers 114A and 114B (collectively, "controller(s) 114"), and may in some examples include one or more external sensors 90 and/or a console 106.

HMD 112 is typically worn by user 110 and includes an electronic display and optical assembly for presenting artificial reality content 122 to user 110. In addition, HMD 112 includes one or more sensors (e.g., accelerometers) for tracking motion of the HMD 112 and may include one or more image capture devices 138 (e.g., cameras, line scanners) for capturing image data of the surrounding physical environment. Although illustrated as a head-mounted display, AR system 100 may alternatively, or additionally, include glasses or other display devices for presenting artificial reality content 122 to user 110.

Each of controller(s) 114 is an input device that user 110 may use to provide input to console 106, HMD 112, or another component of AR system 100. Controller 114 may include one or more presence-sensitive surfaces for detecting user inputs by detecting a presence of one or more objects (e.g., fingers, stylus) touching or hovering over locations of the presence-sensitive surface. In some examples, controller(s) 114 may include an output display, which may be a presence-sensitive display. In some examples, controller(s) 114 may be a smartphone, tablet computer, personal data assistant (PDA), or other hand-held device. In some examples, controller(s) 114 may be a smartwatch, smartring, or other wearable device. Controller(s) 114 may also be part of a kiosk or other stationary or mobile system. Alternatively, or additionally, controller(s) 114 may include other user input mechanisms, such as one or more buttons, triggers, joysticks, D-pads, or the like, to enable a user to interact with and/or control aspects of the artificial reality content 122 presented to user 110 by AR system 100.

In this example, console 106 is shown as a single computing device, such as a gaming console, workstation, a desktop computer, or a laptop. In other examples, console 106 may be distributed across a plurality of computing devices, such as a distributed computing network, a data center, or a cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as being in communication with, e.g., tethered to or in wireless communication with, console 106, in some implementations HMD 112 operates as a stand-alone, mobile AR system, and AR system 100 may omit console 106.

In general, AR system 100 renders artificial reality content 122 for display to user 110 at HMD 112. In the example of FIG. 1, a user 110 views the artificial reality content 122 constructed and rendered by an artificial reality application executing on HMD 112 and/or console 106. In some examples, the artificial reality content 122 may be fully artificial, i.e., images not related to the environment in which user 110 is located. In some examples, artificial reality content 122 may comprise a mixture of real-world imagery (e.g., a hand of user 110, controller(s) 114, other environmental objects near user 110) and virtual objects 120 to produce mixed reality and/or augmented reality. In some examples, virtual content items may be mapped (e.g., pinned, locked, placed) to a particular position within artificial reality content 122, e.g., relative to real-world imagery. A position for a virtual content item may be fixed, as relative to one of a wall or the earth, for instance. A position for a virtual content item may be variable, as relative to controller(s) 114 or a user, for instance. In some examples, the particular position of a virtual content item within artificial reality content 122 is associated with a position within the real-world, physical environment (e.g., on a surface of a physical object).

During operation, the artificial reality application constructs artificial reality content 122 for display to user 110 by tracking and computing pose information for a frame of reference, typically a viewing perspective of HMD 112. Using HMD 112 as a frame of reference, and based on a current field of view as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112 and/or controllers 114, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

AR system 100 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. The artificial reality application may render images of real-world objects, such as the portions of a peripheral device, the hand, and/or the arm of the user 110, that are within field of view 130 along with virtual objects 120, such as within artificial reality content 122. In other examples, the artificial reality application may render virtual representations of the portions of a peripheral device, the hand, and/or the arm of the user 110 that are within field of view 130 (e.g., render real-world objects as virtual objects 120) within artificial reality content 122. In either example, user 110 is able to view the portions of their hand, arm, a peripheral device and/or any other real-world objects that are within field of view 130 within artificial reality content 122. In other examples, the artificial reality application may not render representations of the hand or arm of user 110.

To provide virtual content alone, or overlaid with real-world objects in a scene, HMD 112 may include a display system. For example, the display may include a projector and waveguide configured to translate the image output by the projector to a location viewable by a user's eye or eyes. The projector may include a display and a projector lens. The waveguide may include an input grating coupler to redirect light from the projector into the waveguide, and the waveguide may "trap" the light via total internal reflection (TIR). For example, the display may include arrays of red, green, and blue LEDs. In some examples, a color image may be formed by combination of the red, green, and blue light from each of the red, green, and blue LED arrays via a combiner. The waveguide may include an output grating to redirect light out of the waveguide, for example, towards an eyebox. In some examples, the projector lens may collimate light from the display, e.g., the display may be located substantially at a focal point of the projector lens. The grating coupler may redirect the collimated light from the display into the waveguide, and the light may propagate within the waveguide via TIR at the surfaces of the waveguide. The waveguide may include an output structure, e.g., holes, bumps, dots, a holographic optical element (HOE), a diffractive optical element (DOE), etc., to redirect light from the waveguide to a user's eye, which focuses the collimated light from the display of the projector on the user's retina, thereby reconstructing the display image on the user's retina. In some examples, the TIR of the waveguide functions as a mirror and does not significantly affect the image quality of the display, e.g., the user's view of the display is equivalent to viewing the display in a mirror.

As further described herein, one or more devices of artificial reality system 100, such as HMD 112, controllers 114 and/or a console 106, may include one or more SoCs. Further, one of more of the SoCs may comprise an SoC configured to perform in-line encryption and decryption of secrets (e.g., secret data) that are isolated from an operating system in accordance with the techniques described herein. As used herein, the term "isolated from" means the secret is not available in clear text (e.g., unencrypted form) to components of an operating system, and does not necessarily mean that the operating system cannot access the secret data. For example, the secret data can be stored in a memory accessible by the operating system, but the secret data cannot be decrypted by the operating system.

Figure 2A:
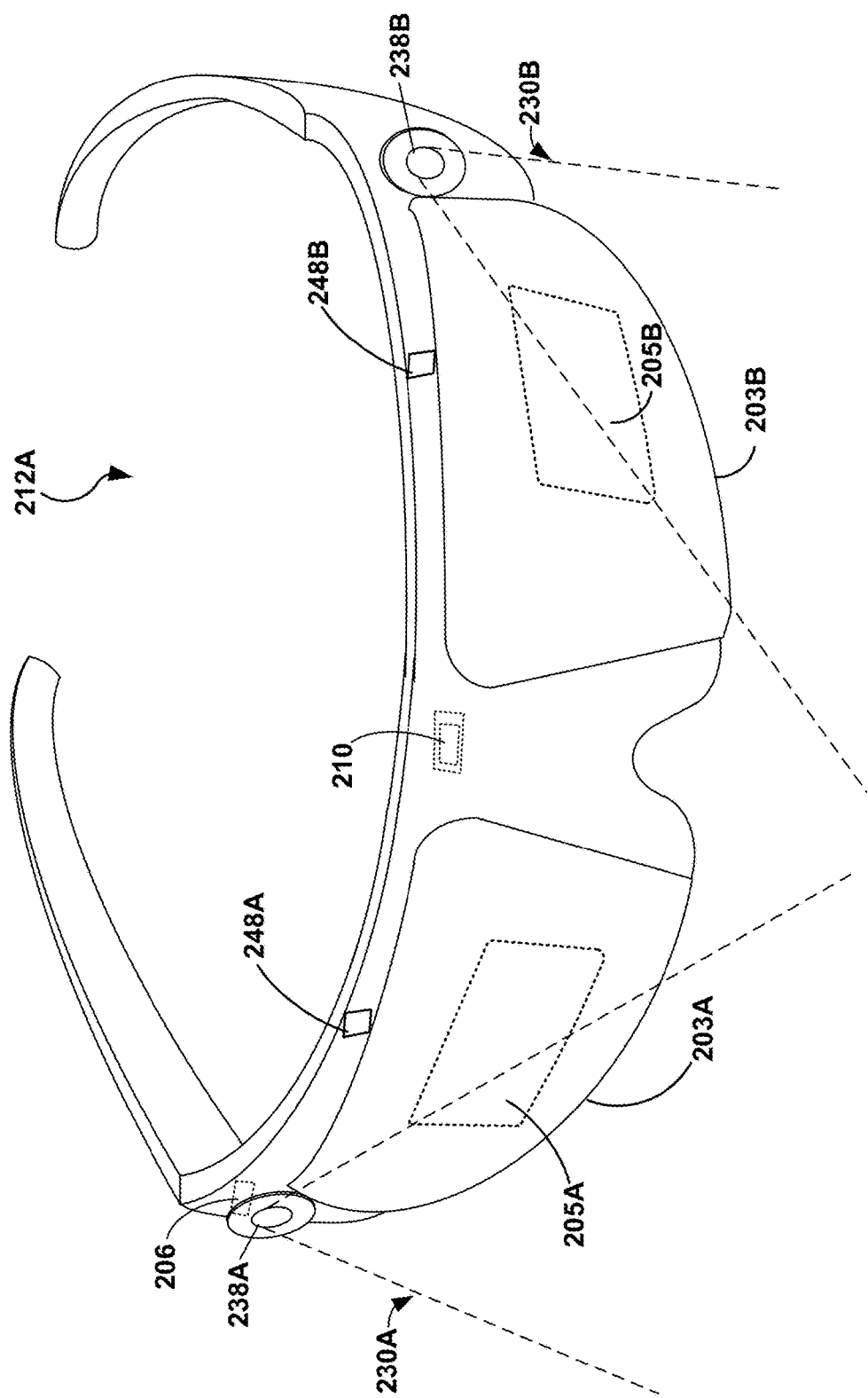
FIG. 2A is an illustration depicting an example HMD that includes an SoC configured to implement high throughput encryption, in accordance with techniques described in this disclosure.

FIG. 2A is an illustration depicting an example HMD that includes an SoC configured to implement high throughput encryption, in accordance with techniques described in this disclosure. HMD 212A of FIG. 2A may be an example of HMD 112 of FIG. 1. As shown in FIG. 2A, HMD 212A may take the form of glasses. HMD 212A may be part of an artificial reality system, such as AR system 100 of FIG. 1, or may operate as a stand-alone, mobile artificial realty system configured to implement the techniques described herein.

In this example, HMD 212A are glasses comprising a front frame including a bridge to allow the HMD 212A to rest on a user's nose and temples (or "arms") that extend over the user's ears to secure HMD 212A to the user. In addition, HMD 212A of FIG. 2A includes one or more waveguides 203A and 203B (collectively, "waveguides 203") and one or more waveguide output structures 205A and 205B (collectively, "waveguide output structures 205") configured to redirect light out of the waveguides 203A and 203B. In the example shown, projectors 248A and 248B (collectively, "projectors 248") may input light, e.g., collimated light, into waveguides 203A and 203B via a grating coupler (not shown) that redirects light from the projectors 248 into waveguides 203 such that the light is "trapped" via total internal reflection (TIR) within the waveguide. For example, projectors 248A and 248B may include a display and a projector lens. In some examples, waveguides 203 may be transparent and alternatively may be referred to as "windows 203" hereinafter. In some examples, the known orientation and position of windows 203 relative to the front frame of HMD 212A is used as a frame of reference, also referred to as a local origin, when tracking the position and orientation of HMD 212A for rendering artificial reality content according to a current viewing perspective of HMD 212A and the user. In some examples, projectors 248 can provide a stereoscopic display for providing separate images to each eye of the user.

In the example shown, waveguide output structures 205 cover a portion of the windows 203, subtending a portion of the field of view 230 viewable by a user 110 through the windows 203. In other examples, the waveguide output structures 205 can cover other portions of the windows 203, or the entire area of the windows 203.

As further shown in FIG. 2A, in this example, HMD 212A further includes one or more motion sensors 206, one or more integrated image capture devices 238A and 238B (collectively, "image capture devices 238"), an internal control unit 210, which may include an internal power source and one or more printed-circuit boards having one or more processors, memory, and hardware to provide an operating environment for executing programmable operations to process sensed data and present artificial reality content on waveguide output structures 205. Internal control unit 210 may include an SoC in accordance with the present disclosure that receives information from one or more of sensor(s) 206, image capture devices 238, controller(s) such as controller(s) 114 as shown in FIG. 1, and/or other sensors, and that forms part of a computing system to process the sensed data and present artificial reality content on waveguide output structures 205 in accordance with the present disclosure. In some aspects, the SoC may perform in-line encryption of data received in a memory of the SoC such that the encrypted data is isolated from an operating system hosted on a subsystem of the SoC.

Image capture devices 238A and 238B (collectively, "image capture devices 238") may include devices such as video cameras, laser scanners, Doppler radar scanners, depth scanners, or the like, configured to output image data representative of the physical environment. More specifically, image capture devices 238 capture image data representative of objects in the physical environment that are within a field of view 230A, 230B of image capture devices 238, which typically corresponds with the viewing perspective of HMD 212A.

Figure 2B:
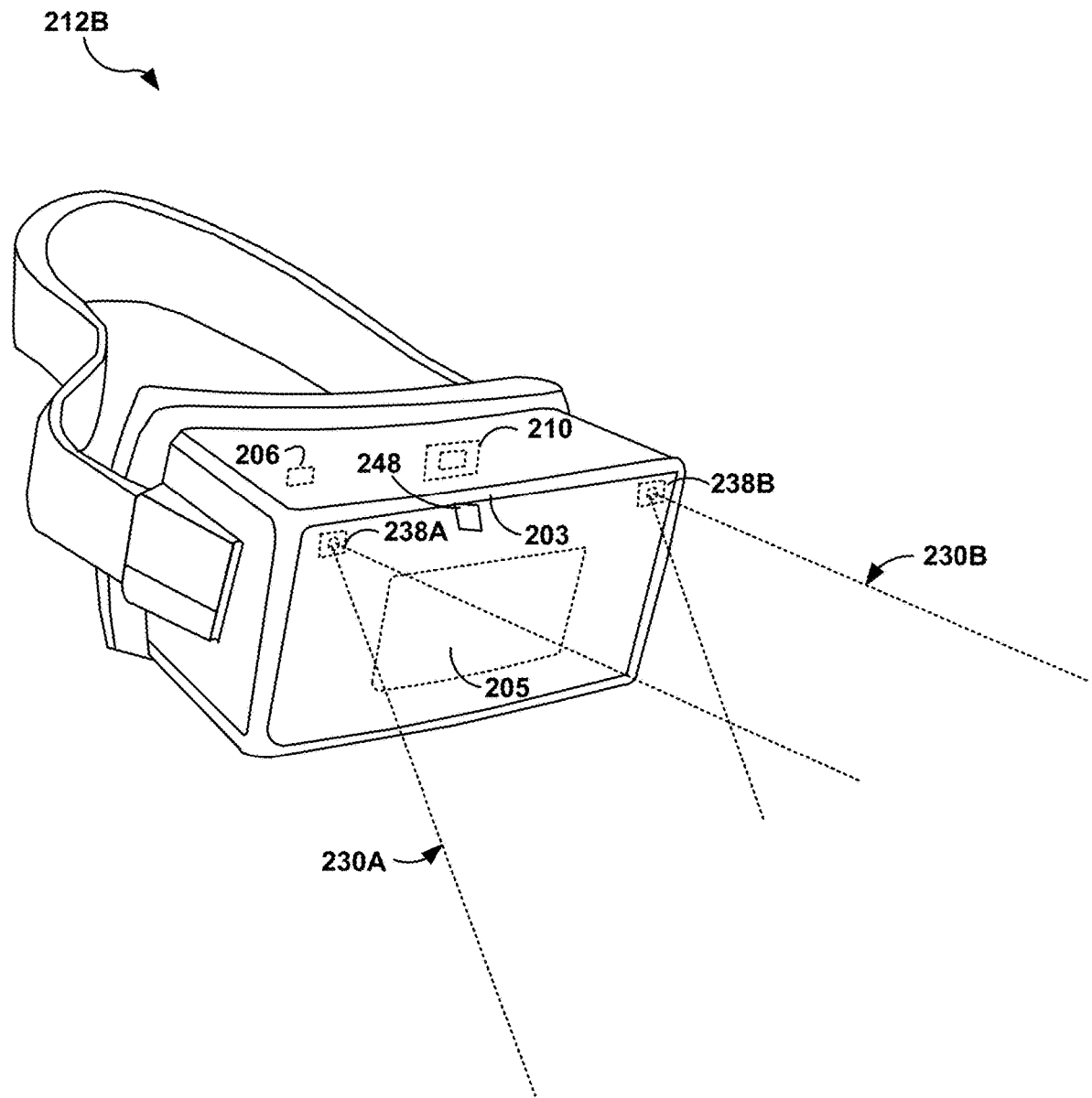
FIG. 2B is an illustration depicting another example HMD that includes an SoC configured to implement high throughput encryption, in accordance with techniques described in this disclosure.

FIG. 2B is an illustration depicting another example HMD that includes an SoC configured to implement high throughput encryption, in accordance with techniques described in this disclosure. HMD 212B may be part of an artificial reality system, such as artificial reality system 100 of FIG. 1, or may operate as a stand-alone, mobile artificial realty system configured to implement the techniques described herein.

In this example, HMD 212B includes a front rigid body and a band to secure HMD 212B to a user. In addition, HMD 212B includes a waveguide 203 (or, alternatively, a window 203) configured to present artificial reality content to the user via a waveguide output structure 205. In the example shown, projector 248 may input light, e.g., collimated light, into waveguide 203 via an input grating coupler (not shown) that redirects light from projector(s) 248 into waveguide 203 such that the light is "trapped" via total internal reflection (TIR) within waveguide 203. For example, projector 248 may include a display and a projector lens. In some examples, the known orientation and position of waveguide 203 relative to the front rigid body of HMD 212B is used as a frame of reference, also referred to as a local origin, when tracking the position and orientation of HMD 212B for rendering artificial reality content according to a current viewing perspective of HMD 212B and the user. In other examples, HMD 212B may take the form of other wearable head mounted displays, such as glasses or goggles.

Similar to HMD 212A of FIG. 2A, the example HMD 212B shown in FIG. 2B further includes one or more motion sensors 206, one or more integrated image capture devices 238A and 238B, an internal control unit 210, which may include an internal power source and one or more printed-circuit boards having one or more processors, memory, and hardware to provide an operating environment for executing programmable operations to process sensed data and present artificial reality content on waveguide output structure 205. Internal control unit 210 may include an SoC in accordance with the present disclosure that receives information from one or more of sensor(s) 206, image capture devices 238, controller(s) such as controller(s) 114 as shown in FIG. 1, and/or other sensors, and that forms part of a computing system to process the sensed data and present artificial reality content on waveguide output structures 205 in accordance with the present disclosure. In some aspects, the SoC may perform in-line encryption of data received in a memory of the SoC such that the encrypted data is isolated from an operating system hosted on a subsystem of the SoC.

Figure 3:
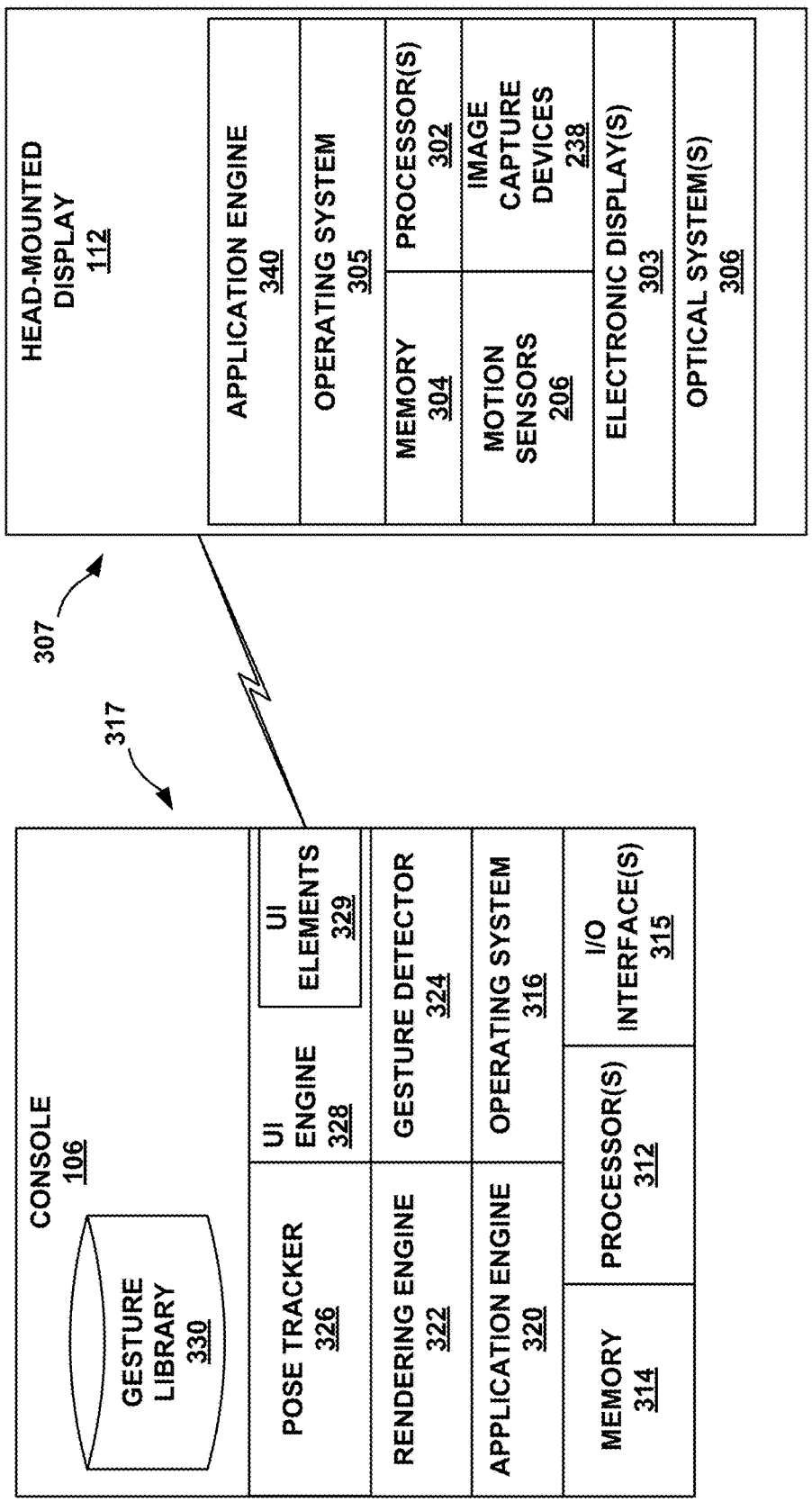
FIG. 3 is a block diagram showing example implementations of a console and an HMD of the artificial reality system of FIG. 1, in accordance with techniques described in this disclosure.

FIG. 3 is a block diagram showing example implementations of a console and an HMD of the artificial reality system of FIG. 1, in accordance with techniques described in this disclosure. In the example of FIG. 3, console 106 performs pose tracking, gesture detection, and user interface generation and rendering for HMD 112 based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to electronic display 303, motion sensors 206, image capture devices 138, and, in some examples, optical system 306. In some examples, processors 302 and memory 304 may be separate, discrete components. In other examples, memory 304 may be on-chip memory collocated with processors 302 within a single integrated circuit such as an SoC. In some examples, functionality of processors 302 and/or memory 304 for aggregating and processing sensed data may be implemented as an SoC/SRAM integrated circuit component arranged in accordance with the present disclosure.

In some examples, optical system 306 may include projectors and waveguides for presenting virtual content to a user, as described above with respect to FIGS. 2A and 2B. For example, optical system 306 may include a projector including electronic display 303 and a projection lens.

In general, console 106 is a computing device that processes image and tracking information received from image capture devices 138 to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controller(s), display device(s), image capture device(s), HMD(s), peripheral device(s), and the like. Moreover, the one or more I/O interfaces 315 may include one or more wired or wireless network interface controllers (NICs) for communicating with a network, such as network 104.

Software components 317 of console 106 operate to provide an overall artificial reality application. In this example, software components 317 include application engine 320, rendering engine 322, gesture detector 324, pose tracker 326, and user interface engine 328.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIG. 1), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Pose tracker 326 may determine a current pose for HMD 112 and, in accordance with the current pose, triggers certain functionality associated with any rendered virtual content (e.g., places a virtual content item onto a virtual surface, manipulates a virtual content item, generates and renders one or more virtual markings, generates and renders a laser pointer). In some examples, pose tracker 326 detects whether the HMD 112 is proximate to a physical position corresponding to a virtual surface (e.g., a virtual pinboard), to trigger rendering of virtual content.

User interface engine 328 is configured to generate virtual user interfaces for rendering in an artificial reality environment. User interface engine 328 generates a virtual user interface to include one or more virtual user interface elements 329, such as a virtual drawing interface, a selectable menu (e.g., drop-down menu), virtual buttons, a directional pad, a keyboard, or other user-selectable user interface elements, glyphs, display elements, content, user interface controls, and so forth.

Console 106 may output this virtual user interface and other artificial reality content, via a communication channel, to HMD 112 for display at HMD 112.

Based on the sensed data from any of the image capture devices 138, or other sensor devices, gesture detector 324 analyzes the tracked motions, configurations, positions, and/or orientations of controllers 114 and/or objects (e.g., hands, arms, wrists, fingers, palms, thumbs) of the user 110 to identify one or more gestures performed by user 110. More specifically, gesture detector 324 analyzes objects recognized within image data captured by image capture devices 138 of HMD 112 and/or sensors 90 to identify controller(s) 114 and/or a hand and/or an arm of user 110, and track movements of controller(s) 114, hand, and/or arm relative to HMD 112 to identify gestures performed by user 110. In some examples, gesture detector 324 may track movement, including changes to position and orientation, of controller(s) 114, hand, digits, and/or arm based on the captured image data, and compare motion vectors of the objects to one or more entries in gesture library 330 to detect a gesture or combination of gestures performed by user 110. In some examples, gesture detector 324 may receive user inputs detected by presence-sensitive surface(s) of controller(s) 114 and process the user inputs to detect one or more gestures performed by user 110 with respect to controller(s) 114.

Figure 4:
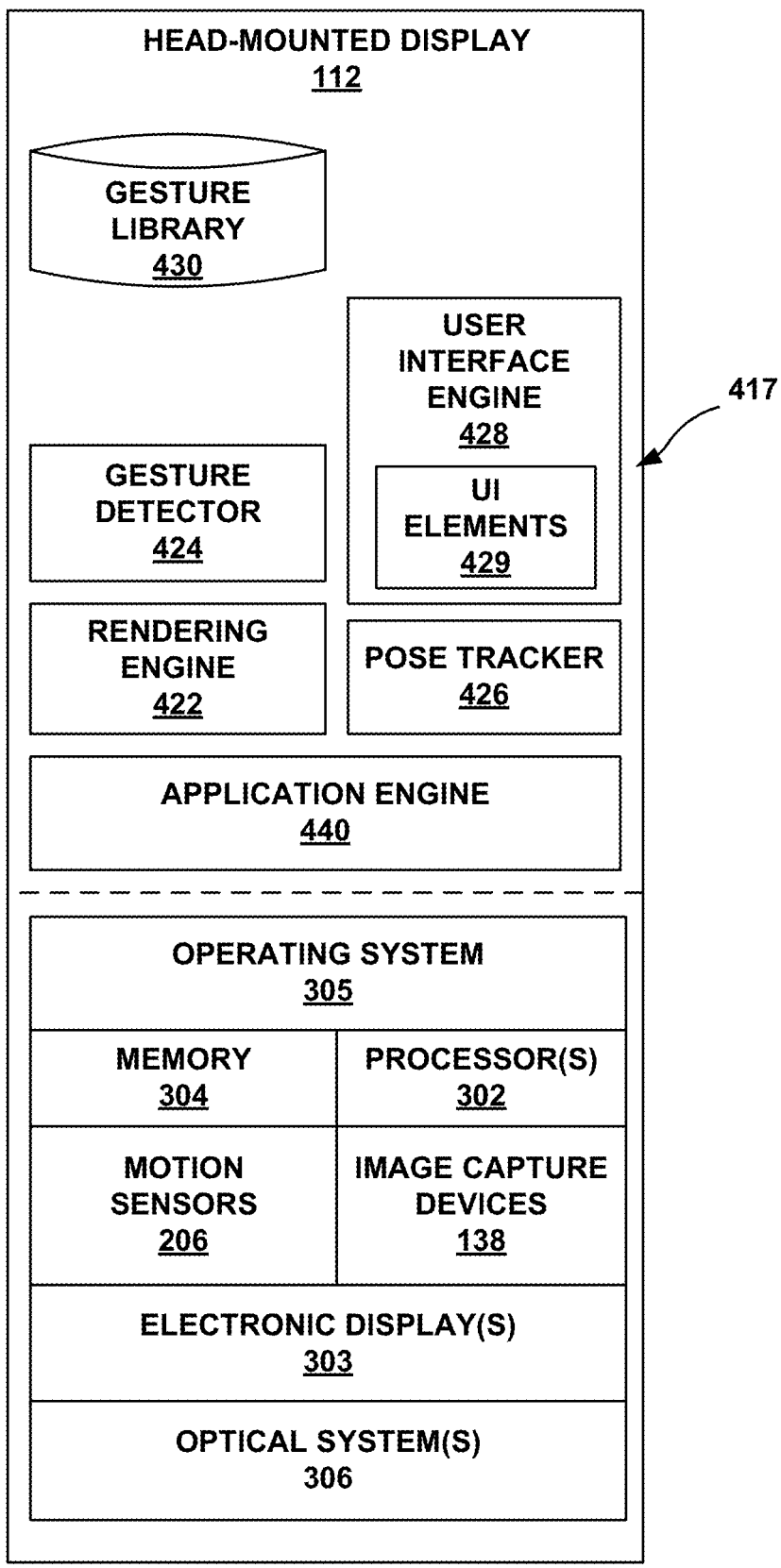
FIG. 4 is a block diagram depicting an example HMD of the artificial reality system of FIG. 1, in accordance with the techniques described in this disclosure.

FIG. 4 is a block diagram depicting an example HMD 112 of the artificial reality system of FIG. 1, in accordance with the techniques described in this disclosure. In the example shown in FIG. 4, HMD 112 is a standalone artificial reality system. In this example, like FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display(s) 303, varifocal optical system(s) 306, motion sensors 206, and image capture devices 138. In some examples, functionality of processors 302 and/or memory 304 for aggregating and processing sensed data may be implemented as an SoC integrated circuit component arranged in accordance with the present disclosure.

In some examples, optical system 306 may include projectors and waveguides for presenting virtual content to a user, as described above with respect to FIGS. 2A-2B. For example, optical system 306 may include a projector including electronic display 303 and a projection lens. The projection lens may further include a multi-functional DOE that functions as both a grating coupler to redirect light into a waveguide and as a lens element improving the imaging quality of the projector lens.

In the example of FIG. 4, software components 417 operate to provide an overall artificial reality application. In this example, software components 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct virtual user interfaces overlaid on, or as part of, the artificial content for display to user 110.

Similar to the examples described with respect to FIG. 3, based on the sensed data from any of the image capture devices such as image capture devices 138, 238 or 102, controller(s) 114, and/or other sensor devices, gesture detector 424 analyzes the tracked motions, configurations, positions, and/or orientations of controller(s) 114 and/or objects (e.g., hands, arms, wrists, fingers, palms, thumbs) of the user to identify one or more gestures performed by user 110.

Figure 5:
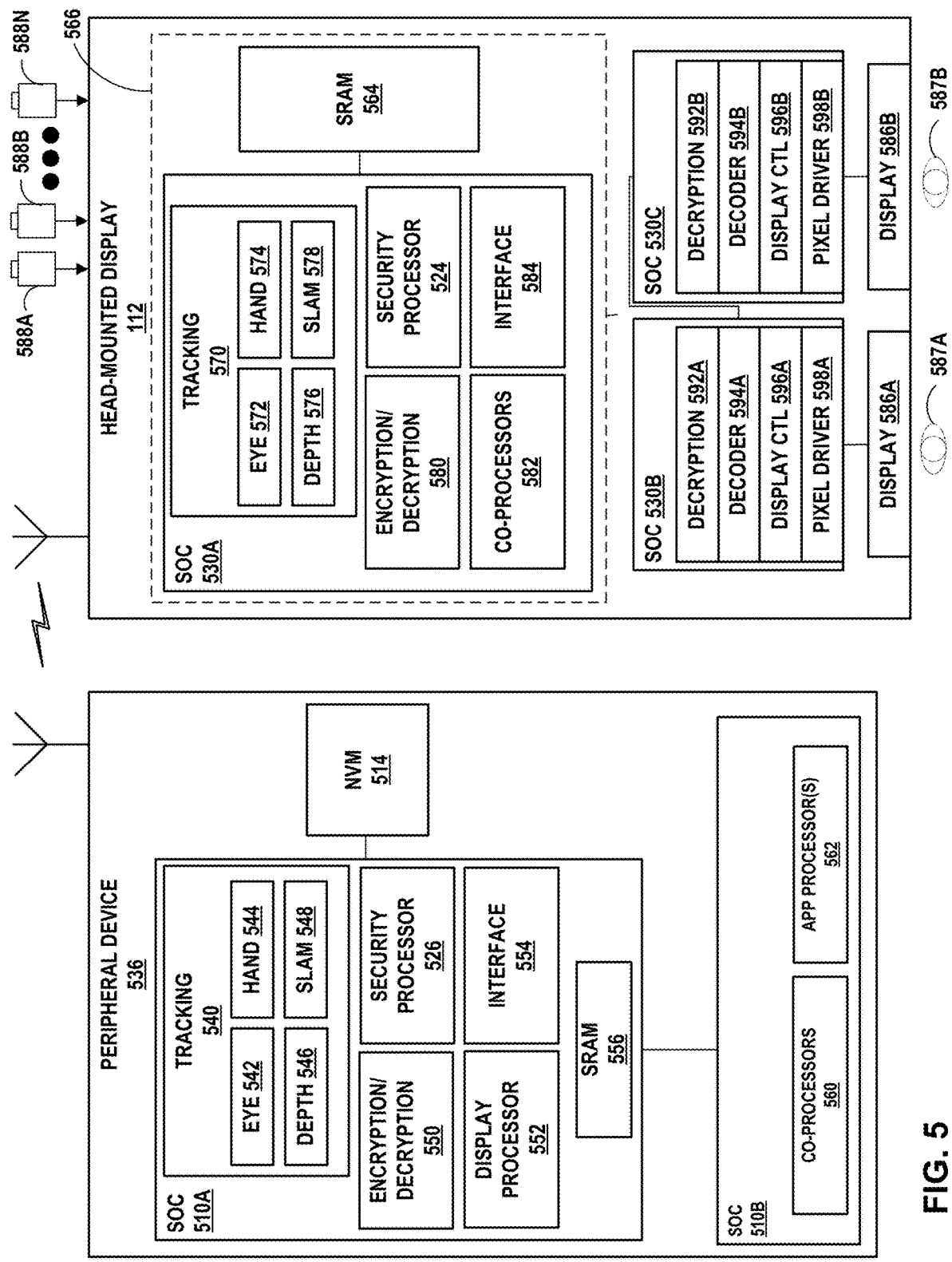
FIG. 5 is a block diagram illustrating an example implementation of a distributed architecture for a multi-device artificial reality system in which one or more devices are implemented using one or more systems-on-a-chip (SoCs) integrated circuits within each device and having wireless communication systems, in accordance with techniques described in this disclosure.

FIG. 5 is a block diagram illustrating an example implementation of a distributed architecture for a multi-device artificial reality system in which one or more devices (e.g., a peripheral device 536 and HMD 112) are implemented using one or more systems-on-a-chip (SoCs) integrated circuits within each device and having wireless communication systems, in accordance with techniques described in this disclosure. FIG. 5 illustrates an example in which HMD 112 operates in conjunction with peripheral device 536. Peripheral device 536 represents a physical, real-world device having a surface on which multi-device artificial reality systems, such as systems 100, overlays virtual content. Peripheral device 536 may include an interface 554 having one or more presence-sensitive surface(s) for detecting user inputs by detecting a presence of one or more objects (e.g., fingers, stylus, etc.) touching or hovering over locations of presence-sensitive surfaces. In some examples, peripheral device 536 may have a form factor similar to any of a smartphone, a tablet computer, a personal digital assistant (PDA), or other hand-held device. In other examples, peripheral device 536 may have the form factor of a smartwatch, a so-called "smart ring," or other wearable device. Peripheral device 536 may also be part of a kiosk or other stationary or mobile system. Interface 554 may incorporate output components, such as one or more display device(s), for outputting visual content to a screen. As described above, HMD 112 is architected and configured to enable the execution of artificial reality applications.

In this example, HMD 112 and peripheral device 536 include SoCs 530A, 510A, respectively, that represent a collection of specialized integrated circuits arranged in a distributed architecture and configured to provide an operating environment for artificial reality applications. As examples, SoC integrated circuits may include specialized functional blocks operating as co-application processors, sensor aggregators, encryption/decryption engines, security processors, hand/eye/depth tracking and pose computation elements, video encoding and rendering engines, display controllers and communication control components. FIG. 5 is merely one example arrangement of SoC integrated circuits. The distributed architecture for a multi-device artificial reality system may include any collection and/or arrangement of SoC integrated circuits.

In the example of FIG. 5, HMD 112 includes SoC/SRAM integrated circuit component 566 in accordance with the techniques of the present disclosure. In particular, SoC/SRAM integrated circuit component 566 includes SoC 530A and a SRAM 564. SRAM 564 is separated or external (e.g., not on-die) from the processor(s) and other on-die circuitry of SoC 530A. Peripheral device 536, in this example, is implemented using a traditional SoC architecture, in which SoC 510A includes an on-die SRAM 556 and external (off-die) non-volatile local memory 514. In contrast, in accordance with the techniques of the present disclosure, SoC 530A does not include an external non-volatile local memory; instead, SRAM 564 of SoC/SRAM integrated circuit component 566 has sufficient memory capacity to perform the functions of both traditional on-die SRAM (such as SRAM 556) and external non-volatile local memory (such as NVM 514).

Head-mounted displays, such as HMD 112 as used in AR/VR systems as described herein, can benefit from the reduction in size, increased processing speed and reduced power consumption provided by the SoC/SRAM integrated circuit component 566. For example, the benefits provided by the SoC/SRAM integrated circuit component 566 in accordance with the techniques of the present disclosure can result in increased comfort for the wearer and a more fully immersive and realistic AR/VR experience.

In addition, it shall be understood that any of SoCs 510 and/or 530 may be implemented using the SoC/SRAM integrated circuit component in accordance with the techniques of the present disclosure, and that the disclosure is not limited in this respect. Any of the SoCs 510 and/or 530 may benefit from the reduced size, increased processing speed and reduced power consumption provided by stacked SoC/SRAM integrated circuit component 566. In addition, the benefits provided by the SoC/SRAM component in accordance with the techniques of the present disclosure are not only advantageous for AR/VR systems, but may also be advantageous in many applications such as autonomous driving, edge-based artificial intelligence, Internet-of-Things, and other applications which require highly responsive, real-time decision-making capabilities based on analysis of data from a large number of sensor inputs.

In this example, SoC 530A of HMD 112 comprises functional blocks including security processor 524, tracking 570, an encryption/decryption 580, co-processors 582, and an interface 584. Tracking 570 provides a functional block for eye tracking 572 ("eye 572"), hand tracking 574 ("hand 574"), depth tracking 576 ("depth 576"), and/or Simultaneous Localization and Mapping (SLAM) 578 ("SLAM 578"). For example, HMD 112 may receive input from one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 588A-588N (collectively, "image capture devices 588"). Image capture devices may include video cameras, laser scanners, Doppler radar scanners, depth scanners, or the like, configured to output image data representative of the physical environment. More specifically, image capture devices capture image data representative of objects (including peripheral device 536 and/or hand) in the physical environment that are within a field of view of image capture devices, which typically corresponds with the viewing perspective of HMD 112. Based on the sensed data and/or image data, tracking 570 determines, for example, a current pose for the frame of reference of HMD 112 and, in accordance with the current pose, renders the artificial reality content.

Encryption/decryption 580 of SoC 530A is a functional block to encrypt outgoing data communicated to peripheral device 536 or a security server and decrypt incoming data communicated from peripheral device 536 or a security server. Co-processors 582 include one or more processors for executing instructions, such as a video processing unit, graphics processing unit, digital signal processors, encoders and/or decoders, AR/VR applications and/or others.

Interface 584 of SoC 530A is a functional block that includes one or more interfaces for connecting to functional blocks of SoC 530B and/or 530C. As one example, interface 584 may include peripheral component interconnect express (PCIe) slots. SoC 530A may connect with SoC 530B, 530C using interface 584. SoC 530A may connect with a communication device (e.g., radio transmitter) using interface 584 for communicating with other devices, e.g., peripheral device 536.

SoCs 530B and 530C of HMD 112 each represents display controllers for outputting artificial reality content on respective displays, e.g., displays 586A, 586B (collectively, "displays 586"). In this example, SoC 530B may include a display controller for display 586A to output artificial reality content for a left eye 587A of a user. For example, SoC 530B includes a decryption block 592A, decoder block 594A, display controller 596A, and/or a pixel driver 598A for outputting artificial reality content on display 586A. Similarly, SoC 530C may include a display controller for display 586B to output artificial reality content for a right eye 587B of the user. For example, SoC 530C includes decryption 592B, decoder 594B, display controller 596B, and/or a pixel driver 598B for generating and outputting artificial reality content on display 586B. Displays 586 may include Light-Emitting Diode (LED) displays, Organic LEDs (OLEDs), Quantum dot LEDs (QLEDs), Electronic paper (E-ink) displays, Liquid Crystal Displays (LCDs), or other types of displays for displaying AR content.

In this example, peripheral device 536 includes SoCs 510A and 510B configured to support an artificial reality application. In this example, SoC 510A comprises functional blocks including security processor 526, tracking block 540, an encryption/decryption block 550, a display processor 552, and an interface 554. Tracking block 540 is a functional block providing eye tracking 542 ("eye 542"), hand tracking 544 ("hand 544"), depth tracking 546 ("depth 546"), and/or Simultaneous Localization and Mapping (SLAM) 548 ("SLAM 548"). For example, peripheral device 536 may receive input from one or more accelerometers (also referred to as inertial measurement units or "IMUs") that output data indicative of current acceleration of peripheral device 536, GPS sensors that output data indicative of a location of peripheral device 536, radar or sonar that output data indicative of distances of peripheral device 536 from various objects, or other sensors that provide indications of a location or orientation of peripheral device 536 or other objects within a physical environment. Peripheral device 536 may in some examples also receive image data from one or more image capture devices, such as video cameras, laser scanners, Doppler radar scanners, depth scanners, or the like, configured to output image data representative of the physical environment. Based on the sensed data and/or image data, tracking block 540 determines, for example, a current pose for the frame of reference of peripheral device 536 and, in accordance with the current pose, renders the artificial reality content to HMD 112.

Encryption/decryption block 550 of SoC 510A encrypts outgoing data communicated to HMD 112 or security server and decrypts incoming data communicated from HMD 112 or security server. Encryption/decryption block 550 may support symmetric key cryptography to encrypt/decrypt data using a session key (e.g., secret symmetric key). Display processor 552 of SoC 510A includes one or more processors such as a video processing unit, graphics processing unit, encoders and/or decoders, and/or others, for rendering artificial reality content to HMD 112. Interface 554 of SoC 510A includes one or more interfaces for connecting to functional blocks of SoC 510A. As one example, interface 584 may include peripheral component interconnect express (PCIe) slots. SoC 510A may connect with SoC 510B using interface 584. SoC 510A may connect with one or more communication devices (e.g., radio transmitter) using interface 584 for communicating with other devices, e.g., HMD 112.

SoC 510B of peripheral device 536 includes co-processors 560 and application processors 562. In this example, co-processors 560 include various processors, such as a vision processing unit (VPU), a graphics processing unit (GPU), and/or central processing unit (CPU). Application processors 562 may execute one or more artificial reality applications to, for instance, generate and render artificial reality content and/or to detect and interpret gestures performed by a user with respect to peripheral device 536.

Figure 6:
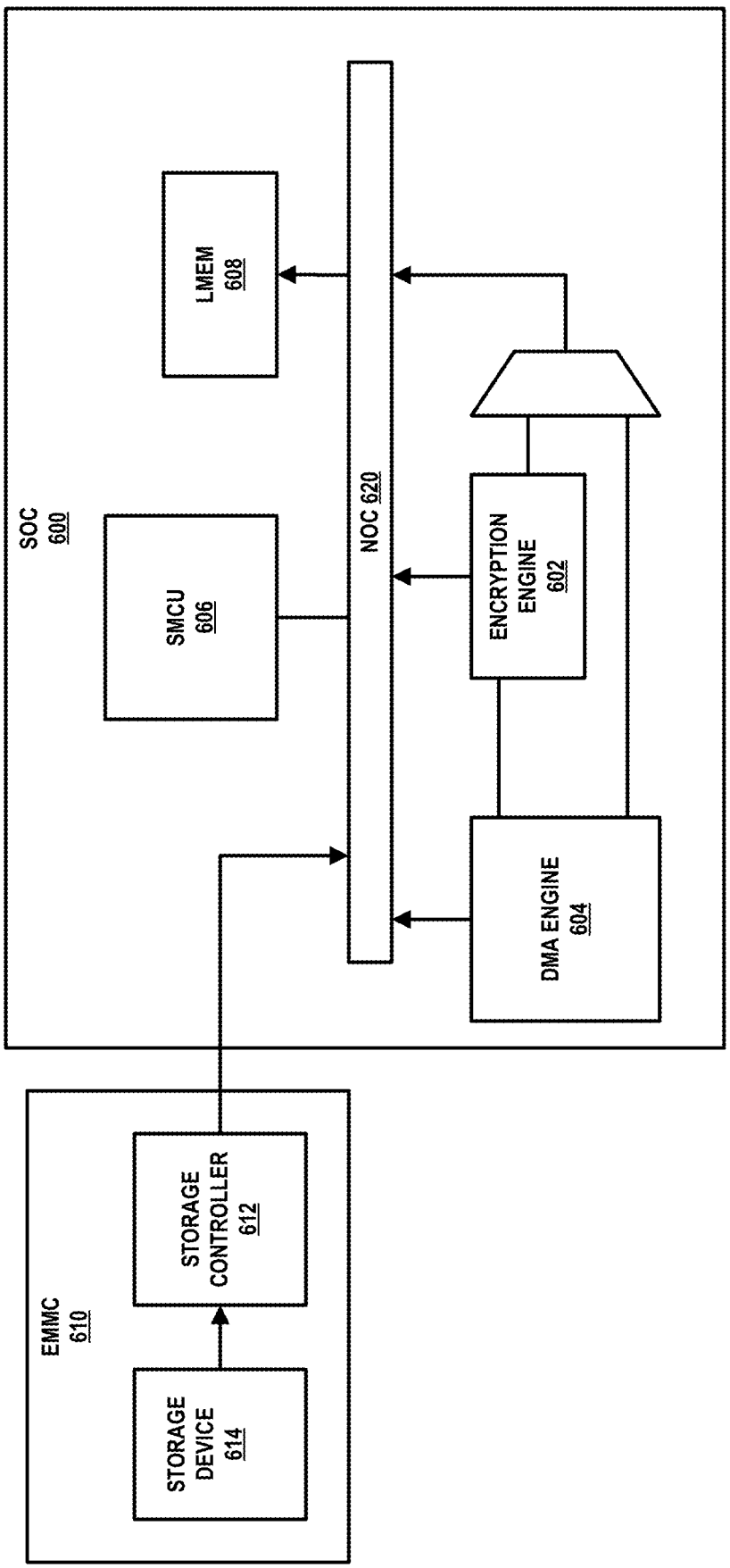
FIG. 6 is a block diagram illustrating an example SoC having an encryption engine, in accordance with techniques described in this disclosure.

FIG. 6 is a block diagram illustrating an example SoC 600 having an encryption engine 602, in accordance with techniques described in this disclosure. As shown in FIG. 6, SoC 600 can include System Micro-Controller Unit (SMCU) 606, local memory 608, Direct Memory Access (DMA) engine 604 and encryption engine 602. SoC 600 may be communicatively coupled to a storage controller 612 that transfers data between storage device 614 and SoC 600 or subsystems of SoC 600. In some aspects, storage controller 612 and storage device 614 may be incorporated into an eMMC 610. In some aspects, storage controller 612, SMCU 606, local memory 608, DMA engine 604 and encryption engine 602 may be communicate with one another via Network on a Chip (NoC) 620. Other communications media may be used in addition to, or instead of NoC 620. Examples of such media include busses, networks, switch fabrics etc.

SMCU 606 can orchestrate various operations on SoC 600. For example, SMCU 606 can orchestrate firmware loading, boot processing, debugging subsystems, etc. Additionally, SMCU 606 can provide configuration data to encryption engine 602.

DMA engine 604 manages data transfer between local memory 608 and devices external to SoC 600 such as storage device 614. DMA engine 604 can receive DMA commands that specify memory addresses in local memory 608 and storage addresses on external devices (e.g., storage device 614) and can transfer data as specified in the commands independently of other processors on SoC 600 such as SMCU 606, a security processor (not shown in FIG. 6) or a general purpose processor (not shown in FIG. 6).

Encryption engine 602 can be coupled to DMA engine 604 and can encrypt and/or decrypt data being transferred between local memory 608 and other devices. Further details on the operation of encryption engine 602 are provided below. As shown in FIG. 6, DMA engine 604 can bypass encryption engine and directly transfer data between local memory 608 and external devices. For example, DMA engine 604 can bypass encryption engine 602 when the source data does not need to be encrypted or decrypted.

Figure 7:
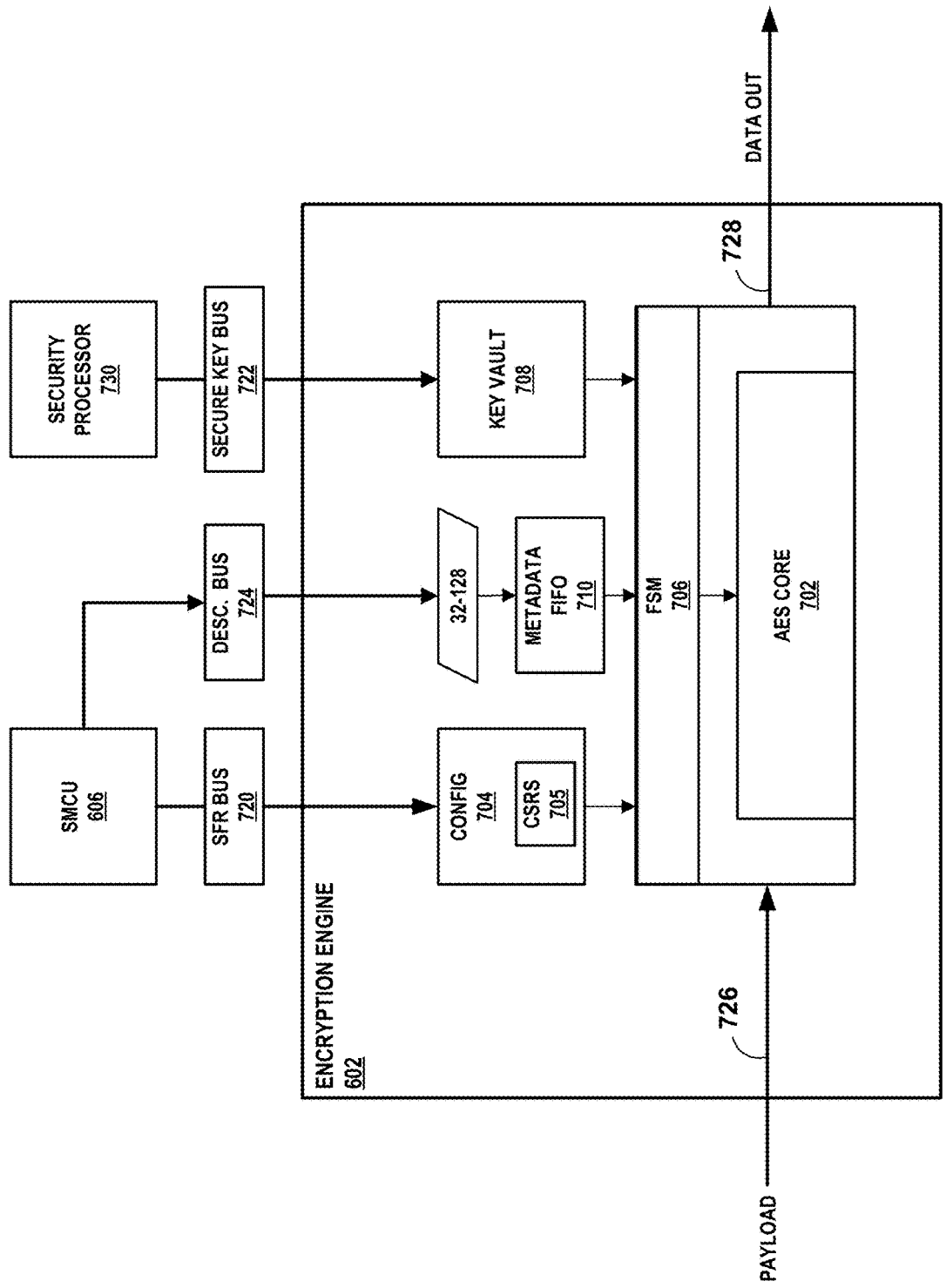
FIG. 7 is a block diagram illustrating further details of an encryption engine, in accordance with techniques described in this disclosure.

FIG. 7 is a block diagram illustrating further details of an encryption engine 602, in accordance with techniques described in this disclosure. In some aspects, encryption engine 602 includes Advanced Encryption Standard (AES) core 702, configuration data 704, metadata First-In, First-Out (FIFO) queue 710, key vault 708, and finite state machine 706.

AES core 702 implements one or more versions of AES. In some aspects, AES core 702 can implement one or more of AES-XTS (Cyphertext Stealing), AES-GCM (Galois/Counter Mode) and/or AES-CTR (Counter) encryption/decryption modes. Details on these encryption/decryption modes may be found in "IEEE Standard for Cryptographic Protection of Data on Block-Oriented Storage Devices," in IEEE Std 1619-2018 (Revision of IEEE Std 1619-2007) pp.1-41, 25 Jan. 2019, which is hereby incorporated by reference. Encryption engine 602 can utilize finite state machine (FSM) 706 to manage state transition during encryption/decryption of data.

Key vault 708 can store key-pairs used for encryption and decryption by encryption engine 602. In some aspects, each key of a key-pair is a 128 bit key. In some aspects, key vault 708 can store up to sixteen key-pairs. A key-pair may be associated with different subsystems of SoC 600 and/or applications executing on subsystems of SoC 600. In some aspects, a key index is an index into a slot of key vault 708 that stores a key-pair. Subsystems and applications executing on the subsystems may be associated with one of the key indices.

Configuration data 704 can include one or more configuration status registers (CSRs) that can store data specifying sector sizes of storage device 614 and can specify restrictions on key usage for particular sectors of storage device 614.

In some aspects, encryption engine 602 includes five interfaces. Status Function Register (SFR) bus 720 can be used to program features and modes for encryption engine 602. Examples of such features and modes include the sector size of storage device 614, streaming mode, encryption mode (e.g., XTS, GCM, CTR), bypass mode, Side-channel attack (SCA) enable etc. Additionally, SFR bus 720 can be used to read back run-time error logs and status information from encryption engine 602. In some aspects, SFR bus 720 is an Advanced Peripheral bus (APB) 32 bit bus.

Descriptor bus 724 can be used by a host such as SMCU 606 to schedule transfer tasks for processing by encryption engine 602. For example, SMCU 606 can schedule metadata for each transfer over descriptor bus 724. For XTS mode, such metadata can include sector address, key index, and the transfer size. The metadata can be placed in metadata FIFO queue 710. In some aspects, an entry in metadata FIFO queue 710 can be a tuple that includes block length, sector address, and a key ID. The tuple may be referred to as a task record for the scheduled transfer task. The key ID can be an index for a slot in key vault 708 (or a mapping to such an index) that holds the key-pair to use for encryption/decryption operations. The key ID may be associated with a particular subsystem or an application executing on the subsystem. In some aspects, metadata FIFO queue 710 can store metadata for 64 transfers.

In some implementations, descriptor bus 724 is a 32 bit bus, and a descriptor entry in FIFO queue 710 is 128 bits. Thus, four writes over descriptor bus 724 are used to insert a metadata tuple into an entry of FIFO queue 710. In some aspects, descriptor bus 724 can be merged with SFR bus 720 to provide a unified APB target.

Secure key bus 722 provides an interface for a processor such as security processor 730 to store key-pairs in key vault 708. In some aspects, secure key bus 722 is a one-way bus. That is, key-pairs may be provided for storage in key vault 708, but the key-pairs may not be read back via secure key bus 722. In some aspects, secure key bus 722 can be an APB 128 bit bus.

Payload interface 726 provides input data for encryption engine 602. Encrypted payload data may receive via payload interface 726 may be decrypted and output via data out interface 728. Similarly, clear text data may be received via payload interface 726, encrypted by encryption engine 602, and encrypted data may be provided via data out interface 728. In some aspects, payload interface 726 and data out interface 728 can be Advanced eXtensible Interface (AXI) 128 bit interfaces. In some aspects, encryption engine 602 intercepts the AXI write data channel and bypasses processing of other control flow data.

It is noted that separate interfaces for streaming data (AXI 128b) and programming descriptors (APB 32b), allows scheduling future transfers concurrent to existing transfers.

Figure 9:
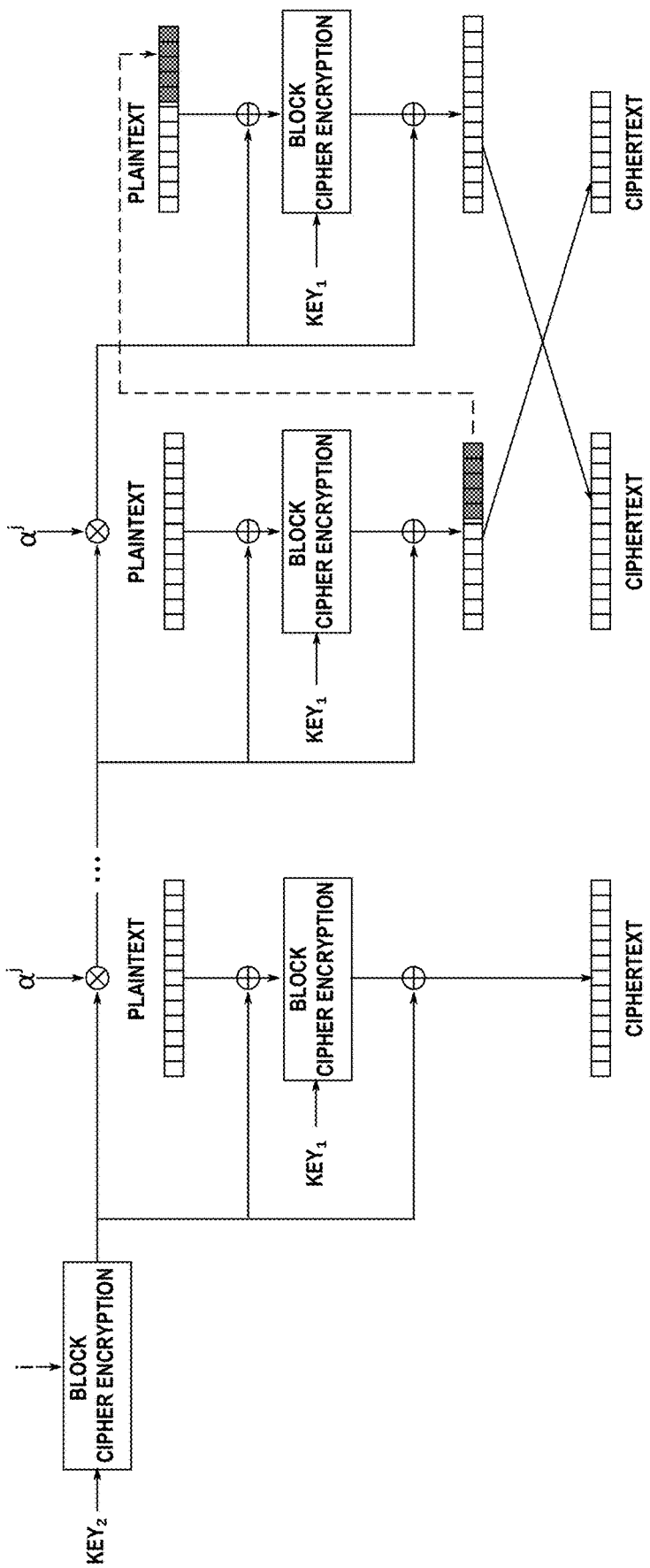
FIG. 9 is a conceptual diagram illustrating AES encryption, in accordance with techniques described in this disclosure.

As noted above, encryption engine 602 can implement the AES-XTS encryption/decryption algorithm. FIG. 9 illustrates AES-XTS encryption with ciphertext stealing, which is one of several encryption modes that may be used in various aspects described in this disclosure. AES-XTS uses two AES keys ($Key_1$ and $Key_2$) that may be 128-bit keys. $Key_1$ is used to perform the AES block encryption; $Key_2$ is used to encrypt what is referred to as a "tweak value." In some aspects, the tweak value can be the sector number i of the sector of storage device 614 where the source data is to be stored. This encrypted tweak value is further modified with a Galois polynomial function a and XORed with both the plain text and the cipher text of each block. Decryption of the data can be performed by reversing this process.

In some aspects, a sector is 512 bytes. AES blocks can be 16 bytes. Thus, 32 16-byte blocks j can be stored in a sector. Thus, for a single sector i, there will be 32 encryptions using the same i value, but different j values (0 to 31) to determine $\alpha^j$.

Further details on AES encryption may be found in "IEEE Standard for Cryptographic Protection of Data on Block-Oriented Storage Devices," in IEEE Std 1619-2018 (Revision of IEEE Std 1619-2007), 25 Jan. 2019 which has been previously incorporated by reference.

As will be appreciated from the above, as a block of data is written, a new $\alpha^j$ is computed. Further, as blocks are written, a sector boundary may be crossed (i.e., sector address i changes), and a new tweak value is computed. In some cases, blocks are 16 bytes, thus a new sector boundary is crossed when 32 blocks have been written and a new tweak value is computed. In some aspects, encryption engine 602 precomputes the tweak values before they are needed for subsequent sectors by determining, using the metadata for a transaction, the sector addresses that will be used to write the entire payload. For example, encryption engine 602 can determine the block length of the data to be written and can obtain a sector size for the storage device from CSRs 705 in configuration data 704 to determine the number of sector boundaries that will be crossed during the write and the sector addresses of those sector boundaries. Encryption engine 602 can use this information to pre-compute the tweak values for subsequent sectors while blocks for a current sector are being encrypted.

Returning to FIG. 7, the operation of an example implementation of the above components of encryption engine 602 will now be described.

At an initialization phase (or at a key update phase), security processor 730 can generate key-pairs and provide the key-pairs to encryption engine 602 for storage in key vault 708. Additionally, SMCU 606 can provide configuration data 704 to encryption engine 602.

SMCU 606 can receive an inter-processor communication (IPC) request to schedule a write to eMMC 610. SMCU 606 can split the data transfer for the request into multiple sub-transactions. SMCU 606 creates a DMA descriptor for each sub-transaction. SMCU 606 also creates transfer metadata for each DMA descriptor. SMCU 606 can read the SFR via SFR bus 720 to determine the number of slots available in metadata FIFO queue 710. SMCU 606 then configures encrypt/decrypt operation modes and schedules the sub-transactions by writing available metadata slots in metadata FIFO queue 710. SMCU 606 then loads a DMA descriptor into DMA engine 604 and triggers the start of the transfer.

Encryption engine 602 fetches the next metadata record from metadata FIFO queue 710 and prepares for bulk-data transfer from DMA engine 604. Once ready to accept data, encryption engine 602 asserts "ready" and starts to accept payload data via payload interface 726. In some implementation, encryption engine 602 accepts 16 byte blocks every fourth clock cycle.

Encryption engine 602 accepts as many blocks as permitted by the metadata block-length parameter in the metadata record. Once block-length is reached, encryption engine 602 advances to the next sub-transaction, de-asserts "ready" on its payload interface 726, prepares for a new data transfer new valid metadata exists in metadata FIFO queue 710. If such metadata exists, encryption engine 602 asserts "ready" to accept the next batch of payload data via payload interface 726.

In some aspects, a metadata entry in metadata FIFO queue 710 includes a flag indicating if it corresponds to the last sub-transaction in a transfer. If so, encryption engine 602 triggers an interrupt to SMCU 606 after completing the last sub-transaction.

As will be appreciated from the above description, after a data transfer request has been made, data can be encrypted and decrypted, and transferred to and from a storage device 614 without involving processors and subsystems other than the DMA engine and encryption engine, free the other processors and subsystems to perform other work.

Figure 8:
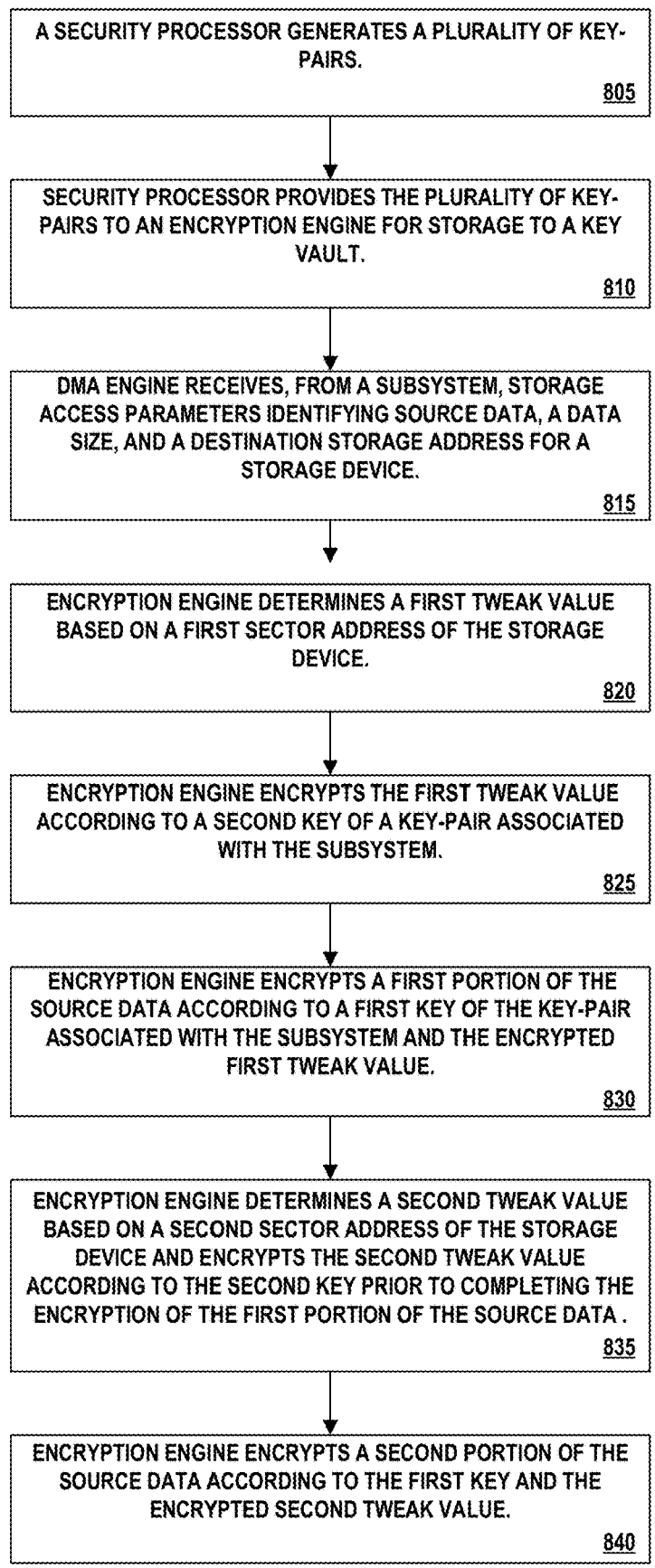
FIG. 8 is a flowchart illustrating example operations of a method for encrypting data, in accordance with techniques described in this disclosure.

FIG. 8 is a flowchart illustrating example operations of a method for encrypting data, in accordance with techniques described in this disclosure. A security processor can generate a plurality of key-pairs (805). Next, the security processor can provide the plurality of key-pairs to an encryption engine for storage to a key vault maintained by the encryption engine. (810). Next, a DMA engine can receive from a subsystem of the plurality of subsystems, storage access parameters identifying source data, a data size, and a destination storage address for a storage device (815). Additionally, a key identifier may be received. The key identifier, in some aspects, can be a key index value identifying a slot in key vault 708 (FIG. 7). Next, the encryption engine can determine a first tweak value based on a first sector address of the storage device (820). Next, the encryption engine can encrypt the first tweak value according to a second key of a key-pair associated with the subsystem (825). Next, the encryption engine can encrypt a first portion of the source data according to a first key of the key-pair associated with the subsystem and the encrypted first tweak value (830). Next, the encryption engine can determine a second tweak value based on a second sector address of the storage device and encrypt the second tweak value according to the second key, wherein the second tweak value is determined and encrypted prior to completing the encryption of the first portion of the source data (835). Next, the encryption engine can encrypt a second portion of the source data according to the first key and the encrypted second tweak value (840).

In the above description, encryption has been discussed as being applied to units of blocks that in turn are organized into sectors. It should be noted that other terms may be used to describe encrypted blocks and the sectors that are composed of encrypted blocks. For example, encryption may be applied to a "unit of encryption" and a block may be composed of multiple units of encryption.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

What is claimed is:

1. A system on a chip (SoC) comprising:
   a system microcontroller comprising processing circuitry configured to orchestrate operations on the SoC;
   a security processor comprising processing circuitry configured to store a plurality of key-pairs to a key vault, each of the key-pairs having a first key and a second key, each of the key-pairs associated with one of a plurality of subsystems of the SoC;
   a Direct Memory Access (DMA) engine comprising circuitry configured to receive, from a subsystem of the plurality of subsystems, storage access parameters identifying source data, a data size, and a destination storage address for a storage device; and
   an encryption engine coupled to the DMA engine, the encryption engine comprising processing circuitry configured to:
   determine a first tweak value based on a first sector address of the storage device, the first sector address based on the destination storage address;
   encrypt the first tweak value according to the second key of the key-pair associated with the subsystem;
   encrypt a first portion of the source data according to the first key of the key-pair associated with the subsystem and the encrypted first tweak value;
   determine a second tweak value based on a second sector address of the storage device and encrypt the second tweak value according to the second key, wherein the second tweak value is determined and encrypted during encryption of the first portion of the source data and prior to completing encryption of the first portion of the source data; and encrypt a second portion of the source data according to the first key and the encrypted second tweak value, wherein the encryption engine comprises a plurality of interfaces, including:
- a first interface to receive, from the system microcontroller, metadata describing a DMA transfer of the source data, the metadata comprising a block length, a sector address, and a key identifier (ID), and
- a one-way second interface to receive the key-pair associated with the subsystem for storage in the key vault, and wherein the key ID identifies a location of the key-pair associated with the subsystem in the key vault.

2. The SoC of claim 1, further comprising a First-in, First-out (FIFO) queue configured to store a plurality of task records, each of the task records comprising a block length, a sector address, and the key ID, wherein the encryption engine obtains a task record from the FIFO queue to determine the first sector address and the key-pair.

3. The SoC of claim 1, further comprising a configuration status register associated with the storage device, the configuration status register defining a sector size for the storage device, wherein the encryption engine utilizes the sector size to determine the second tweak value.

4. The SoC of claim 1, wherein the encryption engine is configured to bypass encryption of the source data in response to a determination that the source data is not received over an Advanced eXtensible Interface (AXI) write channel.

5. The SoC of claim 1, wherein the plurality of interfaces further include a third interface to receive the source data, and a fourth interface to output encrypted source data.

6. The SoC of claim 5, wherein the third interface is communicatively coupled to the DMA engine.

7. The SoC of claim 1, wherein the SoC is configured to support an artificial reality application.

8. The SoC of claim 1, wherein the SoC is integrated into a peripheral device that is communicatively coupled to a head-mounted device (HMD).

9. The SoC of claim 1, wherein the encryption engine is configured to receive the metadata via the first interface while concurrently transferring encrypted source data via a third interface of the plurality of interfaces, the third interface being different than the first interface.

10. An artificial reality system comprising:
a storage device;
a head mounted display (HMD) configured to output artificial reality content, the HMD including at least one system on a chip (SoC), wherein the at least one SoC comprises:
- a security processor comprising processing circuitry configured to store a plurality of key-pairs to a key vault, each of the key-pairs having a first key and a second key, each of the key-pairs associated with one of a plurality of subsystems of the SoC;
- a Direct Memory Access (DMA) engine comprising circuitry configured to receive, from a subsystem of the plurality of subsystems, storage access parameters identifying source data, a data size, and a destination storage address for the storage device; and
- an encryption engine coupled to the DMA engine, the encryption engine comprising processing circuitry configured to:
  - determine a first tweak value based on a first sector address of the storage device, the first sector address based on the destination storage address;
  - encrypt the first tweak value according to the second key of the key-pair associated with the subsystem;
  - encrypt a first portion of the source data according to the first key of the key-pair associated with the subsystem and the encrypted first tweak value;
  - determine a second tweak value based on a second sector address of the storage device and encrypt the second tweak value according to the second key, wherein the second tweak value is determined and encrypted during encryption of the first portion of the source data and prior to completing encryption of the first portion of the source data; and
  - encrypt a second portion of the source data according to the first key and the encrypted second tweak value,
  - wherein the encryption engine comprises a plurality of interfaces, including:
    - a first interface to receive metadata describing a DMA transfer of the source data, the metadata comprising a block length, a sector address, and a key identifier (ID), and
    - a one-way second interface to receive the key-pair associated with the subsystem for storage in the key vault, and
  - wherein the key ID identifies a location of the key-pair associated with the subsystem in the key vault.

11. The artificial reality system of claim 10, wherein the SoC further comprises a First-in, First-out (FIFO) queue configured to store a plurality of task records, each of the task records comprising a block length, a sector address, and the key ID, wherein the encryption engine obtains a task record from the FIFO queue to determine the first sector address and the key-pair.

12. The artificial reality system of claim 10, wherein the SoC further comprises a configuration status register associated with the storage device, the configuration status register defining a sector size for the storage device, wherein the encryption engine utilizes the sector size to determine the second tweak value.

13. The artificial reality system of claim 10, wherein the plurality of interfaces further include a third interface to receive the source data, and a fourth interface to output encrypted source data.

14. The artificial reality system of claim 10, wherein the encryption engine is configured to receive the metadata via the first interface while concurrently transferring encrypted source data via a third interface of the plurality of interfaces, the third interface being different than the first interface.

15. A method comprising:
generating, by a security processor of a system on a chip (SoC), a plurality of key-pairs;
providing, by the security processor, the plurality of key-pairs to an encryption engine, wherein the encryption engine stores the plurality of key-pairs to a key vault, each of the key-pairs having a first key and a second key, each of the key-pairs associated with one of a plurality of subsystems of the SoC;
receiving, by a DMA engine and from a subsystem of the plurality of subsystems, storage access parameters identifying source data, a data size, and a destination storage address for a storage device;

receiving, by the encryption engine and via a first interface of the encryption engine, metadata describing a DMA transfer of the source data, the metadata comprising a block length, a sector address, and a key identifier (ID);

receiving, by the encryption engine and via a one-way second interface of the encryption engine, the key-pair associated with the subsystem for storage in the key vault;

identifying, by the encryption engine based on the key ID, a location of the key-pair associated with the subsystem in the key vault;

determining, by the encryption engine, a first tweak value based on a first sector address of the storage device, the first sector address based on the destination storage address;

encrypting, by the encryption engine, the first tweak value according to the second key of the key-pair associated with the subsystem;

encrypting, by the encryption engine, a first portion of the source data according to the first key of the key-pair associated with the subsystem and the encrypted first tweak value;

determining, by the encryption engine, a second tweak value based on a second sector address of the storage device and encrypting the second tweak value according to the second key, wherein the second tweak value is determined and encrypted during encryption of the first portion of the source data and prior to completing encryption of the first portion of the source data; and encrypting, by the encryption engine, a second portion of the source data according to the first key and the encrypted second tweak value.

16. The method of claim 15, further comprising obtaining, by the encryption engine, a sector address, and the key ID, wherein the encryption engine obtains a task record from a FIFO queue of the encryption engine to determine the first sector address and the key-pair.

17. The method of claim 15, further comprising:
obtaining, by the encryption engine, a sector size for the storage device from a configuration status register associated with the storage device; and
utilizing the sector size to determine the second tweak value.

18. The method of claim 15, further comprising:
bypassing encryption of the source data in response to determining that the source data is not received over an Advanced eXtensible Interface (AXI) write channel.

19. The method of claim 15, further comprising:
while receiving the metadata via the first interface, concurrently transferring encrypted source data via a third interface of the plurality of interfaces, the third interface being different than the first interface.

\* \* \* \* \*